US010549522B2

(12) United States Patent
Jeretzky

(10) Patent No.: US 10,549,522 B2
(45) Date of Patent: Feb. 4, 2020

(54) PROCESSING MACHINE HAVING A PLURALITY OF PROCESSING STATIONS FOR THE PROCESSING OF ARTICLES

(71) Applicant: KOENIG & BAUER KAMMANN GMBH, Bad Oeynhausen (DE)

(72) Inventor: Gerald Jeretzky, Hüllhorst (DE)

(73) Assignee: Koenig & Bauer Kammann GMBH, Bad Oeynhausen (DE)

( * ) Notice: Subject to any disclaimer, the term of this patent is extended or adjusted under 35 U.S.C. 154(b) by 0 days.

(21) Appl. No.: 16/309,598

(22) PCT Filed: Aug. 11, 2017

(86) PCT No.: PCT/EP2017/070442
§ 371 (c)(1),
(2) Date: Dec. 13, 2018

(87) PCT Pub. No.: WO2018/041603
PCT Pub. Date: Mar. 8, 2018

(65) Prior Publication Data
US 2019/0160808 A1 May 30, 2019

(30) Foreign Application Priority Data

Sep. 1, 2016 (DE) .................. 10 2016 216 514
Sep. 13, 2016 (DE) .................. 10 2016 217 376

(51) Int. Cl.
*B41F 15/18* (2006.01)
*B41F 33/16* (2006.01)
(Continued)

(52) U.S. Cl.
CPC .......... *B41F 21/00* (2013.01); *B41F 15/0872* (2013.01); *B41F 15/18* (2013.01);
(Continued)

(58) Field of Classification Search
None
See application file for complete search history.

(56) References Cited

U.S. PATENT DOCUMENTS 4,217,530 A * 8/1980 Dahm .................. B65G 1/0421
250/566
4,787,310 A * 11/1988 Tiemann ................ B65G 25/04
101/40
(Continued)

FOREIGN PATENT DOCUMENTS

DE 4326794 A1 2/1995
DE 20023777 U1 5/2006
(Continued)

OTHER PUBLICATIONS

International Search Report of PCT/EP2017/070442 dated Dec. 6, 2017.

*Primary Examiner* — Jill E Culler
(74) *Attorney, Agent, or Firm* — Mattingly & Malur, PC

(57) ABSTRACT

A processing machine has a plurality of processing stations for the processing of articles. A plurality of the processing stations are each configured in the form of a printing unit. The processing stations, which are provided for processing the articles, are each arranged at different positions. At least one handling device is provided for transporting at least one of the articles which is to be processed. The handling device has a drive which is controlled by a control device and, which handling device, by the use of this drive, can be displaced from one processing station, in which the respective article is processed, to at least one next processing station for processing this article. The processing machine has a learning phase and a production phase. Provision is made for a memory device, which is connected to the control device, to store, in the learning phase, position-related values of the relevant handling system, those position-related values being determined by the use of a calibration travel executed by the relevant handling system for a certain processing procedure. Following the changeover of the processing machine from its learning phase to its production (Continued)

phase, the drive of the relevant handling device is controlled by the control device such that the relevant handling device assumes, one after the other, the positions previously stored for it in the memory device in the learning phase.

21 Claims, 2 Drawing Sheets

(51) Int. Cl.
| | |
|---|---|
| *B41F 21/00* | (2006.01) |
| *B41F 15/08* | (2006.01) |
| *B41F 15/30* | (2006.01) |
| *B41F 15/32* | (2006.01) |
| *B41F 17/00* | (2006.01) |
| *B41F 17/18* | (2006.01) |
| *B41F 17/22* | (2006.01) |
| *G05D 1/02* | (2006.01) |

(52) U.S. Cl.
CPC ............. *B41F 15/30* (2013.01); *B41F 15/32* (2013.01); *B41F 17/002* (2013.01); *B41F 17/006* (2013.01); *B41F 17/18* (2013.01); *B41F 17/22* (2013.01); *B41F 33/16* (2013.01); *B41F 15/0877* (2013.01); *G05D 1/0221* (2013.01); *G05D 2201/0216* (2013.01)

(56) References Cited

U.S. PATENT DOCUMENTS

| | | | |
|---|---|---|---|
| 4,919,967 A | 4/1990 | Handke et al. | |
| 5,142,975 A * | 9/1992 | Podalsky | B41F 15/0872 101/124 |
| 5,202,832 A * | 4/1993 | Lisy | G05D 1/0236 414/343 |
| 5,207,156 A | 5/1993 | Helling | |
| 5,996,486 A | 12/1999 | Karlyn et al. | |
| 2003/0158615 A1* | 8/2003 | Weber | B65G 37/02 700/96 |
| 2009/0185884 A1* | 7/2009 | Wurman | B65G 1/1378 414/270 |
| 2011/0067584 A1 | 3/2011 | Mueller et al. | |
| 2011/0100241 A1 | 5/2011 | Vogt | |
| 2014/0121828 A1* | 5/2014 | Fuhlbrigge | G05B 19/41895 700/228 |

FOREIGN PATENT DOCUMENTS

| | | |
|---|---|---|
| DE | 102008029299 A1 | 12/2009 |
| EP | 0298313 A2 | 1/1989 |
| EP | 0425967 A2 | 5/1991 |
| EP | 1447219 A1 | 8/2004 |
| EP | 2100733 A1 | 9/2009 |
| EP | 2995453 A1 | 3/2016 |

* cited by examiner

PROCESSING MACHINE HAVING A PLURALITY OF PROCESSING STATIONS FOR THE PROCESSING OF ARTICLES

CROSS REFERENCE TO RELATED APPLICATIONS

This application is the U.S. National Phase, under 35 U.S.C. § 371, of PCT/EP2017/070442, filed Aug. 11, 2017; published as WO 2018/041603 A1 on Mar. 8, 2018 and claiming priority to DE 10 2016 216 514.3, filed Sep. 1, 2016 and to DE 10 2016 217 376.6, filed Sep. 13, 2016, the disclosures of which are expressly incorporated herein by reference in their entireties.

FIELD OF THE INVENTION

The present invention relates to a processing machine having a plurality of processing stations for the processing of articles. Each of the plurality of processing stations is configured as a printing unit. Each of the processing stations provided for processing the articles is located at a different position from the other processing stations. At least one handling device is provided for transporting at least one of the articles to be processed. The handling device is equipped with a drive which is controlled by a control system and which can be moved by this drive from one processing station processing the respective article to at least one subsequent processing station processing the article.

The term "article" is understood as a three-dimensional object which has mass and occupies space. Articles are composed of matter. Solids have a solid shape and can be described by boundary surfaces. The present invention relates primarily to a processing machine for processing round articles, in particular hollow articles.

BACKGROUND OF THE INVENTION

DE 200 23 777 U1 discloses a web-processing machine having a transport system for feeding a web to be processed to at least one processing station, with control elements for transporting and/or for processing the web, one control element being driven by means of a drive and a transfer element, wherein a measuring device is provided, by means of which position-dependent output variables for the transfer element can be determined during a teach-in phase, on the basis of predefined position-dependent input variables, and wherein means for storing correction values, calculated from the position-dependent output variables, for the input variables used for the operational phase that follows the teach-in process are provided.

EP 2 100 733 A1 discloses a linear printing machine having interchangeable printing modules for printing on hollow articles, comprising: a) a transport system having a drive, with which the hollow articles to be printed on are transported through the linear printing machine, b) at least a first printing station and a second printing station, which is located downstream of the first printing station in the direction of conveyance of the hollow articles, c) at least one drying station for drying the ink on the printed hollow articles, and d) a machine controller which controls at least the transport of the hollow articles through the linear printing machine, e) wherein each of the printing stations is set up to accommodate a printing module having its own drive, and wherein the printing module can be connected to the machine controller via an interface, f) wherein the printing modules print on the hollow articles using a printing method selected from the following: screen printing and/or flexographic printing and/or offset printing and/or cold embossing and/or hot embossing and/or laser color transfer and/or inkjet printing.

From EP 0 298 313 A2, a method for the series coating of workpieces is known, in which the workpieces are guided by a conveying device along a predetermined conveying path through a coating station, in which process the workpiece is moved relative to a spraying device, which is mounted in particular on an industrial robot and the position of which is controlled with respect to the workpiece by a stored processing program generated in advance during an original coating operation in which a workpiece is flawlessly coated, wherein during the original coating operation, the distance between at least one reference point on the spraying device and at least one selected point on the workpiece is measured and is stored as a standard measurement, and when the workpieces are subsequently supplied in series, the distance between the reference point and the selected point on each of the workpieces is measured again, and any deviations are detected by comparing these measurements with the stored standard measurement, and the processing program is adjusted based upon these deviations in the measurements in order to produce the original coating conditions during the coating process.

DE 43 26 794 A1 discloses a method for printing by at least the offset printing method onto individual articles, the extension of which perpendicular to the substantially flat surface to be printed on is generally relatively small, wherein the position of the surface to be printed on the individual article, which is held by a holding means, is ascertained, after which the offset printing device and the article are adjusted relative to one another for the printing operation so as to bring the transfer surface of at least one transfer means, provided on the periphery of a rotating printing cylinder for the purpose of transferring the print image onto the article, into a position relative to the article which is favorable for the printing operation, after which the offset printing operation is carried out.

SUMMARY OF THE INVENTION

The object of the present invention is to devise a processing machine having a plurality of processing stations for the processing of articles, which processing machine can be easily calibrated automatically and with high positioning accuracy.

The object is attained according to the invention by the provision of the processing machine having a teach-in phase and a production phase. During the teach-in phase, a storage device, which is connected to the control system, stores position-related values for the handling device, and which are calculated for a particular processing procedure, by the use of a calibration run performed by the handling device. Once the processing machine has been switched from its teach-in phase to its production phase, the drive of the handling device is controlled by the control system in such a way that the handling device assumes, in succession the positions stored for it previously in the storage device during the teach-in phase.

The advantages to be achieved with the invention are in particular that a processing machine having a plurality of processing stations for processing articles can be easily calibrated automatically with high positioning accuracy. Additional advantages will become apparent from the following description.

BRIEF DESCRIPTION OF THE DRAWINGS

One exemplary embodiment of the invention is illustrated in the set of drawings and will be described in greater detail below.

In the drawings.

DESCRIPTION OF THE PREFERRED EMBODIMENTS

Figure 1:
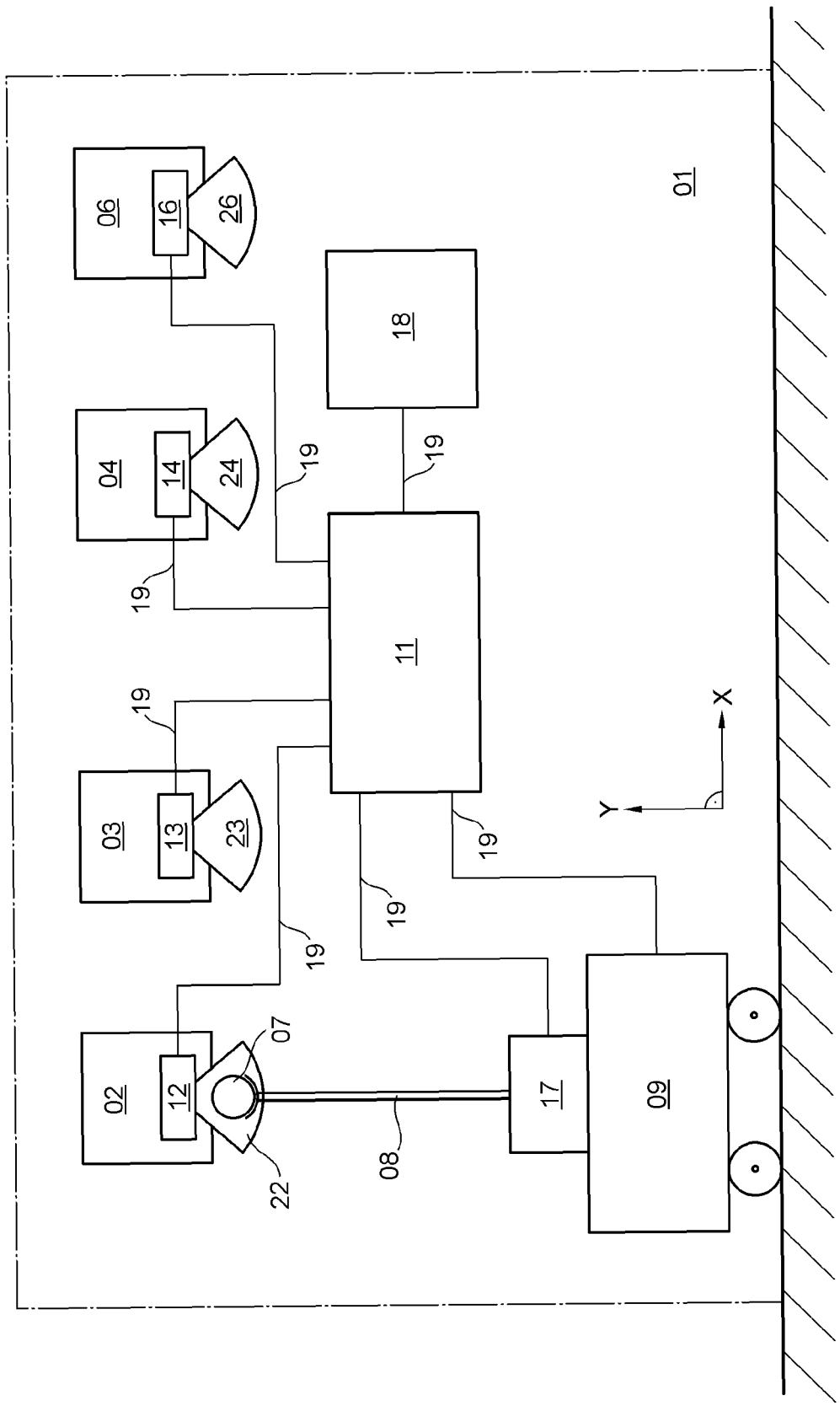
FIG. 1 shows a processing machine having one handling device.

FIG. 1 shows a highly simplified example of a processing machine having a plurality of processing stations 02; 03; 04; 06 for processing articles 07, e.g. four or six or eight or more such processing stations, each of which is fixedly positioned within a working space 01, which is rectangular, for example. The articles 07 to be processed are preferably fed automatically, e.g. by means of a first conveying device, into said working space 01, which is bounded, e.g. by an enclosure, and once they have been processed said articles are preferably removed again automatically, e.g. by means of a second conveying device, or said articles at least can be fed into and removed from the working space 01 of the processing machine in this way. The working space 01 is thus the space in the processing machine in which the individual processing stations 02; 03; 04; 06 for processing the articles 07 are located and in which the articles 07 introduced into this space are processed. The processing stations 02; 03; 04; 06 provided for processing the articles 07 are typically arranged within the working space 01 of the processing machine, indicated in FIG. 1 by a border, each at a position, e.g. a steplessly selectable position, which is preferably permanently defined based upon the choice of said processing machine for performing a specific processing procedure. The respective positions of the processing stations 02; 03; 04; 06 provided for processing the articles 07 in the certain processing procedure are different from one another and are thus spaced apart from one another. The processing stations 02; 03; 04; 06 are arranged in a row, in particular one behind the other in a line, in the direction of transport of the articles 07 to be processed, said direction of transport of the articles 07 to be processed leading substantially from a transfer station located in the area where the articles 07 to be processed are transferred from the first conveying device into the working space 01 to a transfer station located in the area where the processed articles 07 are transferred from the working space 01 to the second conveying device. The processing stations 02; 03; 04; 06 are preferably arranged within the same horizontal plane in the working space 01. The processing stations 02; 03; 04; 06 are, e.g. variable in width in the direction of transport of the articles 07 to be processed. Although each of the processing stations 02; 03; 04; 06 is typically positioned fixedly within the working space 01 of the processing machine, they can each be exchanged at their respective positions for a different type of processing station 02; 03; 04; 06 and/or their respective positions can be adjusted and/or corrected as required within defined limits, enabling the processing machine to be used flexibly and/or optimized for different processing procedures. A varying number of processing stations 02; 03; 04; 06 may be used in the working space 01 of the processing machine, dependent upon the processing procedure in use. During the execution of a certain processing procedure, each of the positions provided for a processing station 02; 03; 04; 06 in working space 01 of the processing machine may be equipped with or occupied by a processing station 02; 03; 04; 06; however, it is not necessary for all of said processing stations 02; 03; 04; 06 to be used in that specific processing procedure; depending upon the requirements of the specific processing procedure, it is possible for only a selection of the existing processing stations 02; 03; 04; 06 to be used. In that case, articles 07 to be processed will be fed only to those processing stations 02; 03; 04; 06 that are selected based upon the specific processing procedure.

In a preferred embodiment of the invention, the processing machine is configured as a printing machine or the processing machine is equipped with at least one printing machine, each of a plurality of processing stations 02; 03; 04; 06 being configured as a printing unit. Each of these printing units is configured such that an article 07 fed to it is or at least can be printed on by it, e.g. in a screen printing process or in a plateless printing process, i.e. in a digital printing process. An inkjet printing unit or a laser, for example, is used to carry out the digital printing process.

The processing machine typically processes multiple articles, usually a large quantity, e.g. several thousand identical articles 07 in a single processing procedure, with each article 07 being processed in the processing procedure intended for it on its outer surface, in particular. For example, each of the articles 07 is imprinted, in particular on its lateral surface, with a preferably multicolored printed image. At least two of the plurality of processing stations 02; 03; 04; 06 located in the working space 01 are involved in the processing procedure intended for the article 07, which is determined, e.g. by selection or some other specification method, with the respective processing procedure defining which of the processing stations 02; 03; 04; 06 present within the working space 01 of the processing machine are to process the article 07 in question, and the sequence in which the respective processing stations 02; 03; 04; 06 are to process said article.

The processing machine is preferably configured such that it can be used to carry out various processing procedures that can be selected or specified, each of these possible processing procedures being defined by the processing stations 02; 03; 04; 06 that are or will be used and by the sequence in which they are used. At least one of the processing stations 02; 03; 04; 06 may be configured as a system for pre-processing or post-processing the respective articles 07, e.g. as a coating unit or as a dryer for drying a printing ink, in particular as a UV dryer, or as a flame treatment system for heating an article 07 to be processed. The selection or specification of the processing stations 02; 03; 04; 06 that are required for the certain processing procedure is made, for example, by an entry into or in conjunction with a control system 11. This control system 11 is configured, e.g. as an electronic, preferably digital, in particular freely programmable computing unit, in particular having at least one microprocessor. The selection of processing stations 02; 03; 04; 06 made dependent upon the processing procedure to be carried out reduces the number of processing stations 02; 03; 04; 06 to be used, e.g. to a subset of the plurality of processing stations 02; 03; 04; 06 located within the same working space 01. Control system 11 is preferably used for the exchange of data, e.g. with a production planning system 21, also referred to as a PPS; the processing procedure to be carried out is specified to the control system 11 by the production planning system 21. A PPS is a computer program or a system of computer programs that assists the user in production planning and production control and manages the data associated with these. The aims of a PPS include the realization of short throughput times, adherence to schedules, optimal inventory levels and the efficient use of resources, i.e. in this case the processing machine with its processing stations 02; 03; 04; 06. Since PPS's are not typically provided for the direct control of production and production systems such as the processing machine with its processing stations 02; 03; 04; 06, for example, a production control panel which in this case includes, e.g. control system 11 is provided for the control of production operations, to enable each of the production units and/or production systems, here in the form of processing stations 02; 03; 04; 06, to be controlled. The production control panel, i.e. control system 11, receives production orders from the PPS, typically via an interface, and these production orders in turn form target data. The production results that are achieved form actual data, which are recorded e.g. by means of a production data recording device and are reported back to the PPS; the PPS then takes these actual data into account in the next planning cycle. This allows a corresponding control loop to be established for production control.

For feeding a plurality of articles 07 to be processed that have been supplied to the working space 01 of the processing machine, preferably feeding said articles individually and in succession, to a processing station 02; 03; 04; 06 which is required according to the intended processing procedure and for transporting said articles from one processing station 02; 03; 04; 06 to the next, at least one handling device 08 is provided. The relevant handling device 08 which is provided for the transport of articles 07 that will be or have been processed has at least one drive 09, e.g. electric or pneumatic, and said at least one drive 09 is or at least can be controlled by control system 11. The relevant handling device 08 is or is to be moved, preferably in a translatory manner, by means of its at least one drive 09 dependent upon control data output by the control system 11, along a path of movement from a first processing station 02; 03; 04; 06 for processing the respective article 07 to at least one subsequent processing station 02; 03; 04; 06 for processing this same article 07, the movement path of said handling device 08 preferably being rectilinear. The path of movement of the relevant handling device 08 provided for transporting the processed article 07 or the article to be processed is defined, for example, by at least one, in particular linear rail system and/or is preferably disposed within a vertical transport plane, and the vertical transport plane which includes the movement path of the handling device 08 in question is disposed in each case lengthwise relative to the positions of the processing stations 02; 03; 04; 06 provided for processing the articles 07. Said handling device 08 is preferably configured as a bidirectionally movable, two-axis system, i.e. said handling device 08 has two axes of movement generally arranged orthogonally to one another, wherein the two-axis system feeds the article 07 in question, which has been or will be processed, within the vertical transport plane starting, e.g. from a transfer station located in the area where the article 07 to be processed is transferred from the first conveying device into the working space 01, to the respective processing station 02; 03; 04; 06 determined by the selected processing procedure, and then delivers the article 07 processed at the processing station 02; 03; 04; 06 in question from said processing station 02; 03; 04; 06, e.g. to the transfer station located in the area where the processed article 07 will be transferred from working space 01 to the second conveying device. The movements that are or at least can be carried out by the handling device 08 in question within the vertical transport plane are indicated in the figures by the directions of movement X and Y, e.g. located within a Cartesian system of coordinates. Each article 07 to be processed preferably is or at least can be advanced from below, i.e. from a vertically lower position, to the processing station 02; 03; 04; 06 in question, which is disposed at a vertically higher position than the handling device 08 in question, e.g. to a screen printing unit or to a digital printing unit. The transport of an article 07 that has been or is to be processed from one processing station 02; 03; 04; 06 to the next is preferably carried out below the horizontal plane in which the individual processing stations 02; 03; 04; 06 are located, in particular arranged in a row.

To increase the mass throughput through this processing machine, i.e. to increase its output volume and/or to utilize the processing stations 02; 03; 04; 06 more efficiently, a plurality of handling devices 08, e.g. at least two or three, are provided in the working space 01 of the processing machine (FIG. 2), and preferably are operated simultaneously or at least can be operated simultaneously along their respective paths of movement, with each of these paths of movement preferably extending within a respective transport plane, and with the transport planes of these handling devices 08 being arranged together with the processing stations 02; 03; 04; 06 within the same working space 01. These multiple handling devices 08 are substantially identical in structure, for example, i.e. fitted with the same components. To ensure that this plurality of handling devices 08 operates simultaneously within the working space 01 of the processing machine without collisions occurring among the handling devices or between the handling devices and the processing stations 02; 03; 04; 06, it is provided that the respective drives 09 of these simultaneously operated handling devices 08 are each controlled on the basis of control data provided by the control system 11, in particular control data output to said drives 09, with these control data causing the respective handling device 08 to move, preferably in a translatory manner, along at least one path of movement, i.e. these control data defining a movement of the respective handling device 08 along a specific path of movement; movements executed along these paths of movement by this plurality of handling devices 08 located within the same working space 01 are collision-free as a result of their programming. Collision-free means that a handling device 08 moved within working space 01 is never located at the same position as another handling device 08 moved within the same working space 01 or at the same position as one of the processing stations 02; 03; 04; 06 located within the same working space 01. The protection against collision of the plurality of handling devices 08 that are located within the same working space 01 and are operated simultaneously is therefore realized not by means of hardware, e.g. by using sensors that are connected to and communicate with control system 11, but by a corresponding drive control, i.e. by corresponding control data output by control system 11. The control data for the drives 09 of the respective handling devices 08 are selected such that the handling devices 08 involved in the execution of a certain processing procedure are prevented from occupying the same position within the working space 01 at the same point in time. Early collision detection and/or collision prevention is enabled and also realized by a corresponding programming of the movement sequences stored in control system 11, i.e. by means of corresponding control data. Furthermore, a protection against collision, implemented by the drive control, of the plurality of handling devices 08 arranged within the same working space 01 and operated simultaneously has the advantage that the respective movements of this plurality of handling devices 08 located within the same working space 01 to be executed along their paths of movement can be and/or are optimized in terms of mass throughput and/or in terms of a low-vibration and/or smoothly running execution by means of a program, in particular taking into account the intended processing procedure, e.g. specified by the production planning system 21, or dependent upon said processing procedure. Such an optimization which is carried out systematically in the control system 11, preferably in an automated manner, e.g. by means of mathematical procedures, factors in e.g. a phase shift between cyclically executed movement sequences of different handling devices 08 and/or waiting times and/or acceleration times or deceleration times within the movement sequences of the handling devices 08 involved in the processing procedure. The respective movements of this plurality of handling devices 08 located within the same working space 01, to be executed along the paths of movement of said handling devices, are then controlled by the control system 11, in each case factoring in a phase shift between cyclically executed movement sequences of different handling devices 08 and/or waiting times and/or acceleration times or deceleration times within these movement sequences of the handling devices 08 involved in the processing procedure.

Figure 2:
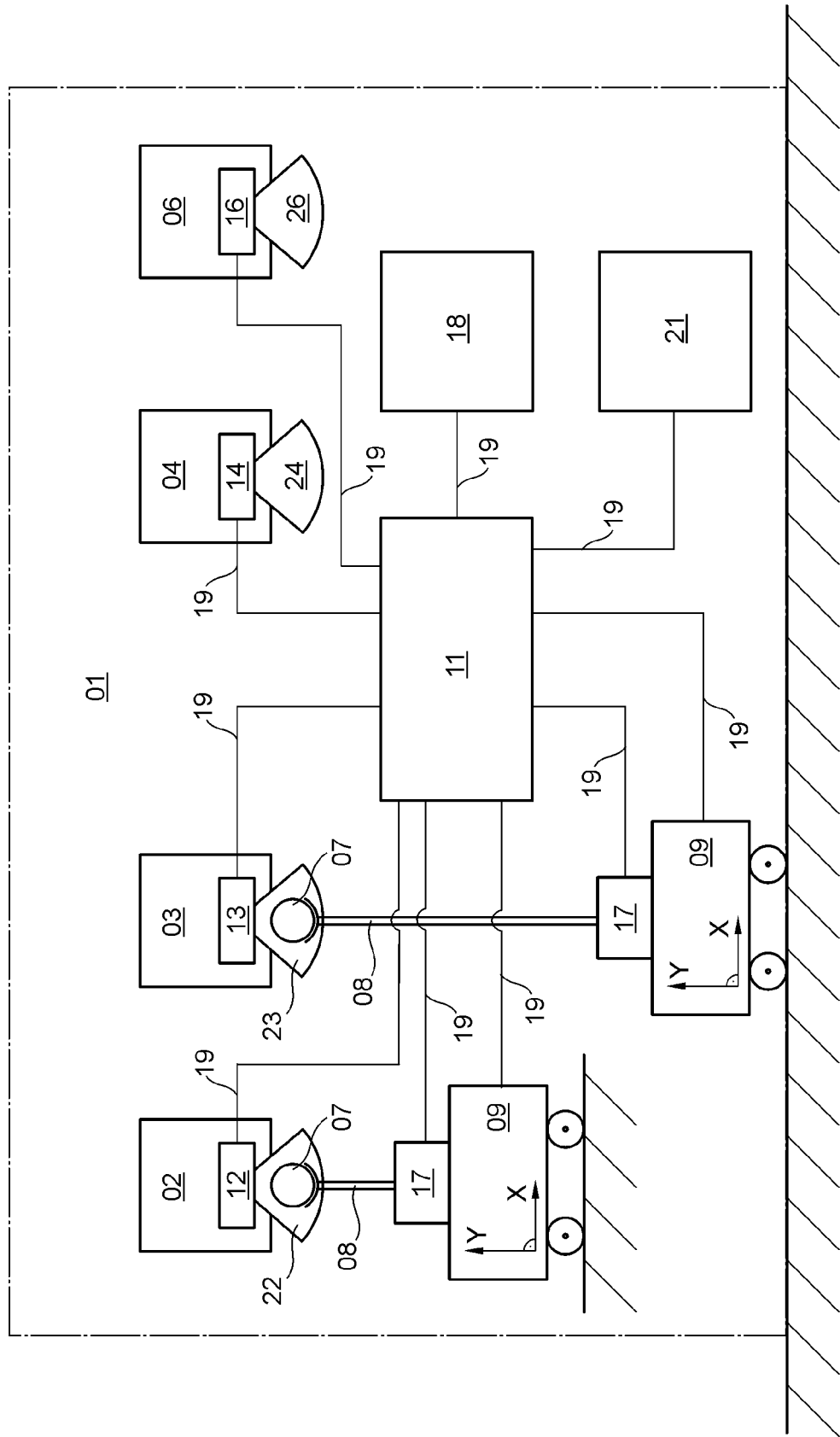
FIG. 2 shows a processing machine having two handling devices.

FIG. 2 shows an example of a processing machine having a plurality of handling devices 08, in this case, e.g. two, located within the same working space 01 and operated or at least operable simultaneously, these two handling devices 08 being located, e.g. in two different horizontal planes that are arranged vertically one above the other and are thus spaced apart from one another, and each being moved or at least movable horizontally, in particular bidirectionally, within its respective plane, e.g. along a rail system. These handling devices 08, each of which is again preferably configured as a two-axis system, each include, e.g. a lifting device with which the article 07 transported by the respective handling devices 08 is or at least can be fed by a vertical movement to the respective processing station 02; 03; 04; 06. Of course, the respective handling device 08 is also used to remove an article 07 that has been processed at a processing station 02; 03; 04; 06 from said station, e.g. by lowering the lifting device, and then to transport said article in the X-direction by a horizontal movement, in particular along a horizontal linear guide, e.g. to the next processing station 02; 03; 04; 06. The lifting device of the respective handling device 08 therefore acts in the Y-direction in particular along a vertical linear guide. The movements of the respective handling device 08 in the X-direction and in the Y-direction are or at least can be executed in succession, or preferably are or at least can be executed simultaneously. The programming stored in control system 11 for the movement sequences of these two handling devices 08 specifies, e.g., that when there is risk of a collision, or in order to avoid collision, the handling device 08 located in the lower of the two vertically superimposed planes, i.e. in particular the lifting device thereof, moves or is moved into a safe lower position, based upon the control data controlling the at least one drive 09 thereof, thereby opening up a path for horizontal movement of the handling device 08 which is located in the upper of the two vertically superimposed planes, which path intersects the movement path of the handling device 08 which is located in the lower of the two vertically superimposed planes. Each respective handling device 08, in particular the lifting device thereof, is equipped, e.g. with a device for receiving the respective article 07 to be processed, said receiving device being configured, e.g., as format-variable, making it adaptable to articles 07 of different geometric shapes.

In a further embodiment of a processing machine having a plurality of handling devices 08, it may be provided that the respective operating zone of each of these handling devices 08 does not intersect or overlap spatially with the respective operating zone of any of the other handling systems 08. The operating zones of each of the handling devices 08 involved in the intended processing procedure are thus separated from one another spatially. In this case, e.g. at least one transfer station is provided between adjacent handling devices 08, and an article 07 that has been or will be processed is or at least can be transferred at the relevant transfer station from one handling device 08 to the next.

To further increase the mass throughput through a processing machine of this type, i.e. to further increase its output volume and/or to utilize the processing stations 02; 03; 04; 06 more efficiently, in one advantageous embodiment of the invention a plurality of vertical transport planes are arranged in the processing machine, each parallel to the others and each spaced horizontally from the others, with at least one handling device 08 being situated in each of these vertical transport planes. The handling devices 08 operating in different vertical transport planes preferably are or at least can be operated independently of one another.

The relevant handling device 08 is embodied, e.g., as a robot, in particular an industrial robot, which can be moved, in particular along at least one linear guide, by means of the relevant drive 09. In transporting the articles 07 to be processed, the handling device 08 in question effects in the processing machine a flow of material along those processing stations 02; 03; 04; 06 that are required for a particular processing procedure. In addition to transport, the relevant handling device 08 performs the function of providing the article to be processed 07 in a defined pose and/or orientation at the respective processing station 02; 03; 04; 06 and/or holding it there during the execution of the specific processing operation. The relevant handling device 08 performs each of its respective functions under program control. The respective handling device 08 is therefore connected to the control system 11 at least with respect to data communication, with the control system 11 controlling the respective functions of the handling device 08 in question.

Processing stations 02; 03; 04; 06 that are provided for processing an article 07 transported by a relevant handling device 08 each have at least one proximity sensor 12; 13; 14; 16, each proximity sensor having a detection zone 22; 23; 24; 26 that projects into the movement path of the handling device 08 in question. A proximity sensor 12; 13; 14; 16, also referred to as a proximity initiator, is a sensor that reacts to the approach of an object (in this case preferably an article 07 and/or the relevant handling device 08 and/or the relevant drive 09 of the respective handling device 08) toward said proximity sensor 12; 13; 14; 16, with the reaction of said sensor taking place without direct contact between the object and the proximity sensor 12; 13; 14; 16, i.e. in a contact-free manner. Proximity sensors 12; 13; 14; 16 are used to detect the position of objects, for example. The detection or recognition of the approach of an object toward the proximity sensor 12; 13; 14; 16 is based, e.g. on an inductive or capacitive or magnetic or optical or ultrasound-based operating principle. In particular, if the processing station 02; 03; 04; 06 in question is configured, e.g. as variable in width in the direction of transport of the articles 07 to be processed, i.e. if said processing station is preferably infinitely variable in its respective width extending in the direction of transport of the articles 07 to be processed, a plurality of proximity sensors 12; 13; 14; 16 are provided in conjunction with the processing station 02; 03; 04; 06 in question, in order to mark, e.g. the beginning or end of said processing station 02; 03; 04; 06 along its width.

The relevant handling device 08 intended for transport of the article 07 to be processed is equipped with an absolute encoder 17, which indicates the position of said handling device 08 with respect to its path of movement. An absolute encoder 17 is a device for measuring length or angle which is used as a position encoder. The absolute measurement supplied by an absolute encoder 17 is available without referencing as soon as the absolute encoder 17 is switched on. An absolute encoder 17 outputs position information or a position-related value in the form of a digital numerical value. Since this numerical value is unique over the entire resolution range of the absolute encoder 17, no initial reference run is required. The determination of the current position information is based, e.g. on an inductive or capacitive or magnetic or optical operating principle.

The at least one proximity sensor 12; 13; 14; 16 of the respective processing station 02; 03; 04; 06 and the absolute encoder 17 of the respective handling device 08, along with the respective drive 09 of the respective handling device 08, are each connected at least in terms of data communication to the control system 11, either wirelessly or in a wired connection via a line system 19, e.g. via a line system 19 configured as a data bus system, with the control system 11 generally having a preferably digital storage device 18.

The processing machine has at least two operating modes, specifically at least one teach-in phase and one production phase. In a first operating mode of the processing machine, i.e. in its teach-in phase, it is provided that the storage device 18 stores the position-related value, indicated in particular by the respective absolute encoder 17 with respect to the path of movement of the relevant handling device 08 intended for the transport of the article 07 to be processed, in each case dependent upon a certain processing procedure intended for the respective article or articles 07, when said handling device 08 is located, i.e. is disposed, within the detection zone 22; 23; 24; 26 of the relevant proximity sensor 12; 13; 14; 16 of the processing station 02; 03; 04; 06 that includes this proximity sensor 12; 13; 14; 16. When the processing machine is in its first operating mode, a calibration run is performed for the handling device 08 in question which is intended for transport of the article 07 to be processed. The processing machine is prepared for a certain processing procedure with the aid of the calibration run and is configured for the relevant processing procedure based upon the position-related values calculated, in particular by means of the respective absolute encoder 17, during the calibration run. Upon completion of the teach-in phase, the processing machine preferably switches automatically to its second operating mode, i.e. to its production phase, and is then capable of executing the functions of its second operating mode.

In the second operating mode of the processing machine, the relevant drive 09 of the handling device 08 in question is controlled by control system 11 in such a way that said handling device 08 assumes in succession the positions with respect to the path of movement of said handling device 08 that are stored in storage device 18 during the first operating mode of the processing machine, dependent upon the particular processing procedure intended for the respective article or articles 07. This second operating mode of the processing machine corresponds to a production phase for said processing machine, in which the handling device 08 in question advances to each of the previously stored and thus taught-in positions in succession, in each case dependent upon the particular processing procedure intended for the respective article or articles 07, and the respective article or articles 07 is/are processed in the processing station 02; 03; 04; 06 in question.

To increase the positioning accuracy of the relevant handling device 08, it is provided that during the first operating mode of the processing machine, i.e. during the teach-in phase, the handling device 08 in question advances multiple times to each processing station 02; 03; 04; 06 that is required for a particular processing procedure intended for the respective article 07, and that when said handling device 08 is situated within the detection zone 22; 23; 24; 26 of the relevant proximity sensor 12; 13; 14; 16 of the processing station 02; 03; 04; 06 that includes this proximity sensor 12; 13; 14; 16, the respective position-related value indicated with respect to the path of movement of the relevant handling device 08 intended for transport of the article 07 to be processed is stored in the storage device 18. The advance to the same processing station 02; 03; 04; 06 multiple times, e.g. twice, is carried out, e.g. during the back and forth movement of the handling device 08 in question along its specified path of movement. To calculate the position-related value to be used during the second operating mode of the processing machine, i.e. during the production phase of said processing machine, it is provided that the control system 11 calculates, e.g. the arithmetic mean value of the position-related values detected for a specific processing station 02; 03; 04; 06 and then uses this mean value to control the at least one drive 09 of the respective handling device 08 and thus to adjust the respective handling device 08 in the second operating mode of the processing machine to the position belonging to that specific processing station 02; 03; 04; 06.

Since it is provided that the storage device 18 stores the position-related value indicated by the respective absolute encoder 17 with respect to the path of movement of the handling device 08 in question intended for transport of the article 07 to be processed, in each case dependent upon a particular processing procedure intended for the respective articles 07, the control system 11 can verify, e.g. by comparing the current production run with previous identical production runs, whether the processing stations 02; 03; 04; 06 that are required to carry out the intended processing procedure are present and correct, i.e. installed at the correct position, for example.

In one advantageous refinement of the identified solution, each of the processing stations 02; 03; 04; 06 is equipped with an automatically readable identifier, e.g. an RFID. When a handling device 08 is located within the detection zone 22; 23; 24; 26 of the relevant proximity sensor 12; 13; 14; 16 of the processing station 02; 03; 04; 06 that includes said proximity sensor 12; 13; 14; 16, it may be provided that the relevant processing station 02; 03; 04; 06 having the identifier is identified, e.g. with respect to the handling device 08, and transmits technical information relating to its function and/or its performance data, either directly or via said handling device 08, to the control system 11, so that this technical information can be stored in the storage device 18, in each case together with the detected position-related value. Such additionally provided technical information may be, for example, "screen printing unit—240 mm wide" or "digital printing unit—80 mm wide—cyan ink". Using this additionally provided technical information, the intended processing procedure can be monitored even more closely.

If multiple handling devices 08, in particular handling devices that operate simultaneously, are located in the processing machine, it is preferably provided that each of these handling devices 08 performs a calibration run, e.g. independently of the others, prior to its respective production phase.

It is additionally provided, for example, that control system 11 evaluates the position-related values stored in storage device 18 for different processing stations 02; 03; 04; 06, optionally in conjunction with additional technical information, in order to output, e.g. on a display means connected to the control system 11, a recommendation for the optimized positioning of the processing stations 02; 03; 04; 06 within the working space 01 and/or for the sequence of use of said stations with regard to a specific processing procedure intended for the respective article 07.

It may be provided that at least one of the processing stations 02; 03; 04; 06 is equipped with one positioning means each, and the respective positioning means is or at least can be used to adjust the position of the processing station 02; 03; 04; 06 in question automatically, i.e. in particular controlled via control system 11, in particular for the purpose of optimizing performance for a specific processing procedure.

According to the invention, a processing machine having a plurality of processing stations 02; 03; 04; 06 for processing articles 07 is proposed, wherein each of a plurality of processing stations 02; 03; 04; 06 is configured as a printing unit, wherein each of the processing stations 02; 03; 04; 06 intended for processing the articles 07 is located at a different position from the other processing stations, wherein at least one handling device 08 is provided for transporting at least one of the articles 07 to be processed, wherein the handling device 08 in question is equipped with a drive 09 controlled by a control system 11 and can be moved by means of this drive 09 from one processing station 02; 03; 04; 06 processing the respective article 07 to at least one subsequent processing station 02; 03; 04; 06 processing said article 07, wherein this processing machine has a teach-in phase and a production phase, it being provided that during the teach-in phase, a storage device 18 connected to the control system 11 stores position-related values for the relevant handling device 08, calculated for a specific processing procedure by means of a calibration run performed by the handling device 08 in question, wherein once said processing machine has been switched from its teach-in phase to its production phase, the drive 09 of the handling device 08 in question is controlled by the control system 11 such that the handling device 08 in question assumes in succession the positions stored for it previously in the storage device 18, during the teach-in phase. Configurations of this proposed processing machine are apparent from the two figures in conjunction with the corresponding description.

While a preferred embodiment of a processing machine having a plurality of processing stations for the processing of articles, in accordance with the present invention, has been set forth fully and completely hereinabove, it will be apparent to one of skill in the art that various changes could be made to the subject invention without departing from the true spirit and scope of the invention which is accordingly to be limited only by the appended claims.

The invention claimed is:

1. A processing machine comprising:
   a working space;
   a plurality of processing stations in the working space, each processing station being adapted for performing a processing procedure on articles to be processed by the processing machine, each of the plurality of processing stations being configured as a printing unit, each of the plurality of processing stations provided for processing the articles being located at a different position from other ones of the plurality of processing stations, wherein the positions of each of the plurality of processing stations, to carry out their respective processing procedures, are arranged within a same horizontal plane;
   at least one handling device for transporting at least one of the articles to be processed, which at least one handling device being equipped with a drive controlled by a control system which at least one handling device is movable by its drive from a first one of the plurality of processing stations processing a respective one of the articles to at least one subsequent one of the plurality of processing stations processing said article, each of the articles to be processed, being transported, by the at least one handling device, from one of the plurality of processing stations to a subsequent one of the plurality of processing stations, below the horizontal plane in which the individual ones of the plurality of processing stations are located;
   a lifting device in the at least one handling device, with which lifting device the article being transported by the at least one handling device, one of is and can be fed to the respective one of the plurality of processing stations by a vertical movement of the lifting device;
   a teach-in phase and a production phase of the processing machine, wherein, during the teach-in phase, a storage device connected to the control system stores position-related values for the at least one handling device, and calculated for a particular processing procedure during a calibration run performed by the at least one handling device, wherein, once said processing machine has been switched from its teach-in phase to its production phase, the drive of the at least one handling device is controlled by the control system whereby the at least one handling device assumes, in succession, the positions stored for it previously in the storage device during the teach-in phase, the at least one handling device provided for transport of the plurality of articles to be processed being configured such that it transports each of the plurality of articles individually and successively from the one of the plurality of processing station to the subsequent one of the plurality of processing stations; and
   at least one proximity sensor in each of the plurality of processing stations for processing ones of the transported articles, each proximity sensor having a detection zone, which detection zone for each proximity sensor projects into a path of movement of the at least one handling device.

2. The processing machine according to claim 1, wherein the at least one handling device provided for transport of the articles to be processed is equipped with an absolute encoder, which absolute encoder indicates a respective position of said at least one handling device with respect to a path of movement of the at least one handling device.

3. The processing machine according to claim 2, wherein at least the at least one proximity sensor of the respective one of the plurality of processing stations and the absolute encoder of the at least one handling device are each connected to the control system, which is equipped with the storage device.

4. The processing machine according to claim 2, wherein, during the teach-in phase of the processing machine, the storage device stores a position-related value, indicated by the absolute encoder, with respect to the path of movement of the at least one handling device intended for transport of the article to be processed, dependent upon a particular processing procedure intended for the respective article.

5. The processing machine according to claim 4, wherein the storage device stores the position-related value indicated by the respective absolute encoder when the at least one handling device is located within the detection zone of the at least one proximity sensor of the one of the plurality of processing stations that includes said proximity sensor.

6. The processing machine according to claim 1, wherein the plurality of processing stations are arranged one of in a row and one behind the other in a line in the same horizontal plane in a direction of transport of the articles to be processed.

7. The processing machine according to claim 1, wherein each of the plurality of processing stations is arranged fixedly in the working space.

8. The processing machine according to claim 1, wherein each article to be processed one of is and can be advanced from its vertically lower position to the at least one of the plurality of processing stations, which is situated at a vertically higher position than the at least one handling system.

9. The processing machine according to claim 1, wherein the working space is one of rectangular and is enclosed.

10. The processing machine according to claim 1, wherein at least one of the plurality of processing stations is configured as a device for one of pre-processing and post-processing the articles to be processed and is in the form of one of a coating unit and a dryer, in particular a UV dryer, and a flame treatment device.

11. The processing machine according to claim 1, wherein each of the plurality of processing stations located within the working space can be exchanged with a different type of one of the processing stations at its respective position.

12. The processing machine according to claim 1, wherein the at least one handling device is moved in one of a translatory manner and bidirectionally along its path of movement.

13. The processing machine according to claim 1, wherein the path of movement of the at least one handling device is rectilinear.

14. The processing machine according to claim 1, wherein the at least one handling device is configured as a movable two-axis system, wherein the two-axis system feeds the article to be processed to the respective one of the plurality of processing stations and then removes it from said station.

15. The processing machine according to claim 1, wherein the path of movement of the at least one handling device, and provided for transport of the articles to be processed, is arranged within a vertical transport plane.

16. The processing machine according to claim 1, wherein a plurality of vertical transport planes are arranged parallel to one another and spaced apart from one another, wherein a separate one of the at least one handling device is arranged in each of these spaced vertical transport planes.

17. The processing machine according to claim 1, wherein the control system calculates a mean value of a plurality of positions for a particular one of the plurality of processing stations which are detected during the teach-in phase of the processing machine, and then uses this mean value during the production phase of the processing machine to adjust the respective handling device to a position belonging to said particular one of the plurality of processing stations.

18. The processing machine according to claim 1, wherein at least one of the plurality of processing stations has an automatically readable identifier, wherein the at least one of the plurality of procession stations having said automatically readable identifier transmits one of technical information relating to a function of said at least one processing station and its performance data to the control system, one of either directly and via the at least one handling device, so that this technical information one of is and can be stored, together with the detected position-related value, in the storage device.

19. The processing machine according to claim 1, wherein the control system evaluates the one of the position-related values and technical information relating to various ones of the plurality of processing stations that is stored in the storage device to output a recommendation for one of optimized positioning of the ones of the plurality of processing stations and a sequence of use thereof for a particular processing procedure intended for the respective article.

20. The processing machine according to claim 1, wherein at least one of the plurality of processing stations is equipped with a positioning means, wherein the position of said at least one of the plurality of processing stations one of is and can be adjusted by the respective positioning means, and controlled by the control system.

21. The processing machine according to claim 1, wherein the processing machine is embodied as a printing machine.

* * * * *